United States Patent [19]

Burnett

[11] Patent Number: 4,765,359
[45] Date of Patent: Aug. 23, 1988

[54] FILLING MANIFOLD FOR PLURAL FUEL TANKS

[76] Inventor: Jonathan P. Burnett, 4881 Sunset Ave., La Cresenta, Calif. 91214

[21] Appl. No.: 41,540

[22] Filed: Apr. 23, 1987

[51] Int. Cl.4 .................................... B65D 25/00
[52] U.S. Cl. .................................. 137/255; 137/587; 141/237
[58] Field of Search ............... 137/255, 256, 587, 263; 141/237, 246, 236; 220/85 R, 85 S, 85 VR, 85 VS

[56] References Cited

U.S. PATENT DOCUMENTS 2,006,393  7/1935  Hapgood .................. 141/236
2,389,168  11/1945  Snyder .................... 137/587 X
3,800,978  4/1974  Sigwald ................... 137/587 X
3,982,399  9/1976  Rookey ................... 137/255 X Primary Examiner—Alan Cohan
Attorney, Agent, or Firm—Hadd Lane

[57] ABSTRACT

This invention relates to improvements in fuel filling operations on vehicle utilizing two or more fuel tanks that are placed on opposite sides of the frame of the vehicle. The invention provides a manifold whereby such vehicle to be fueled may have its tanks filled from either side of the vehicle by a single operation. The invention further contemplates the addition of an extra tank opposite to the original tank in the instances where the vehicle has only one tank.

8 Claims, 2 Drawing Sheets

FILLING MANIFOLD FOR PLURAL FUEL TANKS

Most vehicles, such as trucks and vans, have a single tank on one side of the vehicle only, which must be filled from that side, or have dual tanks on opposite sides of the vehicle, each requiring filling from its side. This leads to considerable inconvenience.

An object of this invention is to provide a filling manifold whereby fuel may be placed in both tanks simultaneously from either side, thus obviating turning the vehicle around or passing the filling hose across the vehicle.

It is also an object to instal the manifold without major modifications to the vehicle and substantially no modifications to the tanks themselves.

The manifold of this invention readily adapts to most tank configurations. Also the mentioned addition of an extra tank, when using this manifold requires no cutting of a new fuel door in the vehicle body.

The manifold also includes an air venting system permitting complete filling of all tanks, the air exiting on the side being selected for filling.

The manifold of this invention allows for gravity filling of all tanks, and also gravity venting of all tanks and pipes; valves, pumps, pressurization or vacuumizing means, etc., being unnecessary. Thus all the pipes, vents and tanks are in open communication with each other for unobstructed gravity filling and venting.

The invention further allows independent switching as to the tank selected for the engine supply.

The invention permits an operator of attendant to fuel a vehicle with plural tanks from either side of the vehicle. Also, if a person desires to add an extra tank to an existing configuration, the invention permits him to do so readily.

Figure 1:
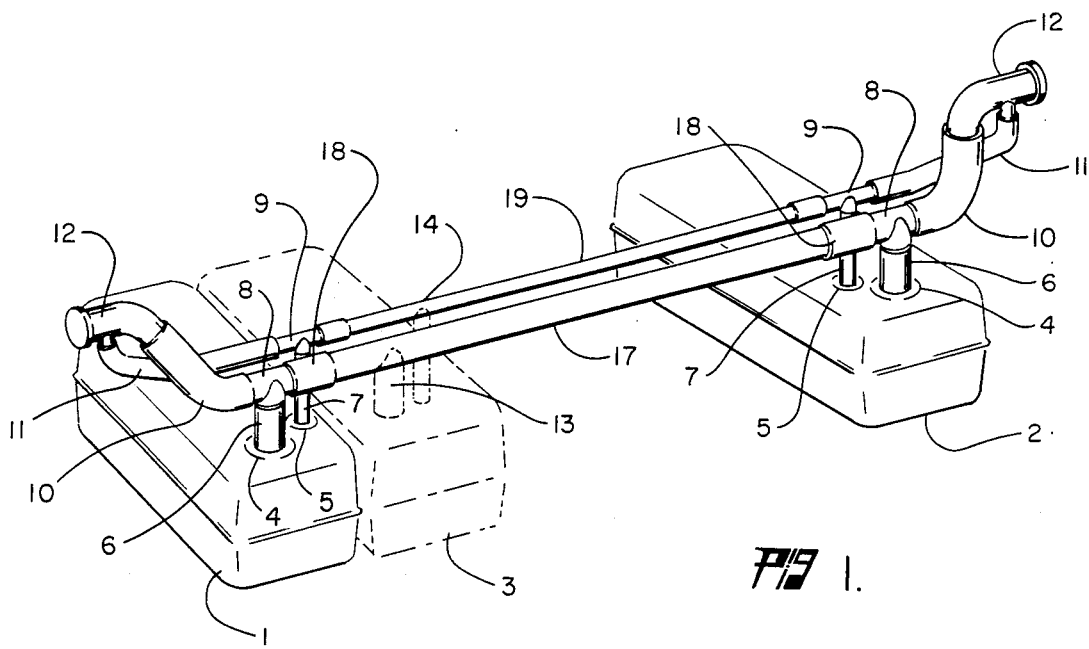
FIG. 1 is an isometric view of two tanks, as they would appear in a vehicle, connected by the manifold to each other and to two filling inlets, and also with a diagram of the placement of a third tank. A venting system is also shown.
Figure 2:
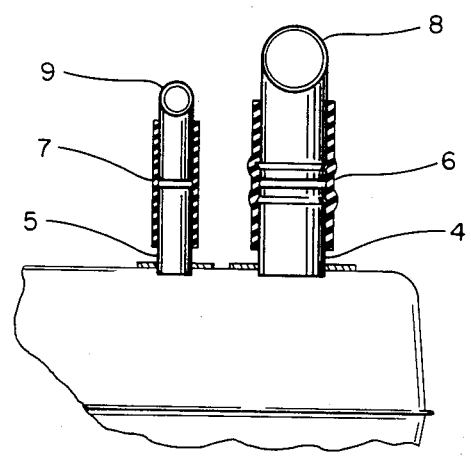
FIG. 2 is a side elevation of how the manifold is connected to the fuel and vent nozzles, utilizing rubber hoses.

FIG. 1 illustrates the fuel tank placement as found on the majority of vehicles with dual tanks (1 and 2) and the possible location of a third tank 3. On some vehicles the tank at location 3 would be the original, or stock tank, while tanks 1 and 2 would be added by the owner if the extra fuel capacity is needed. The liquid fuel enters each tank at entrance fittings 4—4, which are connected to tees 8—8 with sections of rubber hose 6—6. The air displaced from the tanks by the entering liquid fuel leaves the tanks via vent fittings 5—5, which are connected with venting tees 9—9 by sections of rubber hoses 7—7. Fuel is introduced into the manifold at a selected inlet neck 12, during which the cap of the selected inlet is removed while the other cap is left in sealing position. The fuel then passes from neck 12 to a section of rubber hose 10 to the first tee connection 8, where the fuel will fall by gravity through the connecting hose 6 and fitting 4 into the tank 1 (when filling from the left inlet 12) to start the filling of this tank. The air that must be displaced by the rising fuel in the tank 1 will vent out at 5, through hose 7 to vent tee 9. From vent tee 9, this air will flow via the left vent 11, to and enter filling neck 12 and out to atmosphere. After (or during) the filling of the first tank 1, the fuel will then travel through connecting hose 18. If a third tank 3 is on the truck, connecting hose 18 will be connected to another tee 8 to fill tank 3 in the same manner as tank 1. Otherwise hose 18 is connected to flow pipe 17 to traverse the distance between the tanks and over the vehicle frame. From flow pipe 17 the fuel flows through connecting hose 18 to tee 8 of tank 2, from whence the fuel again by gravity will flow through hose 6 to the entrance filling 4 and into the tank 2. The air being displaced by the rising fuel will vent out the vent nozzle 5 of that tank, through the connecting hose 7 to vent tee 9, through the vent hose 19, to the tee 9 of tank 1, to the left vent pipe 11, then into left filling neck 12 to atmosphere. The right gas cap is left closed.

The tanks may also be filled from the opposite (right) side. In this event the left filling cap closes the left filling neck, the right cap is removed and the fuel and air flow oppositely as in the former situation. After filling, the right cap is replaced and the vehicle is ready for service.

The option for a third tank 3 is shown where the fuel tee 8 would be inserted at 13. The vent tee 9 would be inserted at 14. The flow pipe 17 is made with a hose locking rib 20 at each end, and an additional rib may be made so that this pipe may be shortened to compensate for the insertion of the fuel tee 8 of the third tank.

Figure 3:
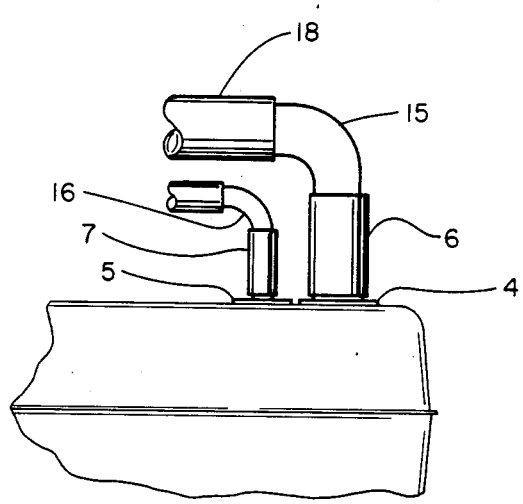
FIG. 3 is an end elevation of how the manifold of the invention is connected to a fuel tank which may terminate the manifold.
Figure 4:
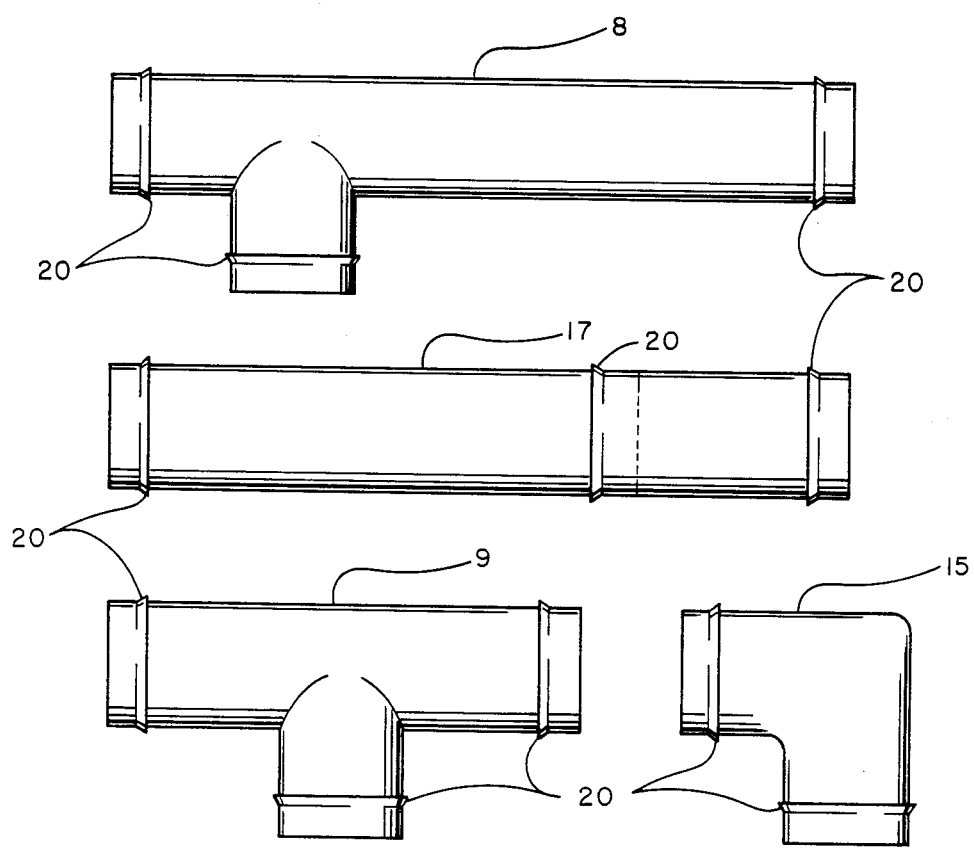
FIG. 4 is a view of the individual component needed in the installation of a dual tank system.

On a vehicle which has only one tank and on which the owner desires an additional tank for greater fuel capacity, FIG. 3 shows how the fill and vent connections must be made so that the original fuel filling port may be used and an additional fuel filling port need not be cut into the vehicle body. This is done by connecting the first fuel tank to a fuel tee 8, to connect hose 18 to flow pipe 17 to connect hose 18 to terminating fuel elbow 15, to rubber hose section 6 to entrance fitting 4 and into tank 3. The vent hose 19 is likewise connected to vent fitting 5. With this connection, all tanks would be filled from one side, using the original fuel fill neck and port only.

Various modifications and adaptions are believed readily made. Thus merely connecting the outlets of the tanks to a common line leading to the suction of the fuel pump of the engine will result in all tanks being uniformly and equally used. However, if closer control is desired, a shut-off valve could be placed in the line from each tank to determine which tank should be used.

Also, some tanks have only one opening for both filling and venting. In this event, the vent line would be placed inside the neck 12, hose 10, tee 8 where the vent tee 9 would provide a line (similar to 7) leading to the inside of the tank, ending at the top of the tank, and also provide for line 14 to continue inside line 17 to the vent outlet in 12, with a side vent leading down into the other tank. The result would be the same whereby the fuel would be filled and the air vented from either side.

The drawings show the manifold as being made of separate pipes and discrete pipe fittings (tees and elbows) connected thereto, and this is preferred. However, the pipes and fittings could be integrally molded. with the necessary cutting to length and connecting of the parts.

It is further contemplated that the manifold, with the vent assembly, may be furnished in kit form whereby the main pipes 17, 19, 10, 11 etc., could be cut to size by the purchaser and installed by him or his agent.

I claim:

1. In a vehicle driven by a liquid fuel-burning engine, said vehicle having a fuel tank with a filling opening, and a filling zone at the periphery of said vehicle; the improvement comprising an additional, separate tank having a filling opening, for additional fuel, installed on said vehicle, a filling neck for said tanks terminating in said zone, a first pipe extending from said neck to a position adjacent said filling opening of said first mentioned tank, a liquid conducting means between said position and said last mentioned filling opening, an intermediate pipe continuing said first pipe to the filling opening of said additional tank, all of the pipes, filling openings and the filling neck being in open communication and arranged for gravity filling of both tanks during a single continuous filling operation, and a vent assembly comprising a vent opening in the top of each tank, a connecting pipe connected to each vent opening, and a pipe connecting said connecting pipe to the interior of said filling neck, said vent assembly thus being in open communication with said tanks at their upper portions and with the atmosphere at the time of filling said tanks.

2. The improvement of claim 1 wherein the pipe connections are made with discrete pipe fittings.

3. The improvement of claim 1 wherein the said filling zone is on a side of said vehicle, and there is a second filling zone on the opposite side, there being a second filling neck at said second zone, a further pipe continuing said second neck to and communicating with said intermediate pipe at the filling opening of said additional tank, and a further vent assembly communicating with the first vent assembly at the vent opening of said additional tank and with the atmosphere at said second zone.

4. The improvement of claim 1 wherein the filling and vent assemblies terminate at said additional tank.

5. The improvement of claim 1, further comprising a second additional fuel tank having a fill opening and a top vent opening mounted on said vehicle, there being a third connecting pipe from said intermediate pipe to the fill opening of said second additional tank, said vent assembly also having means to communicate with the vent opening of said second additional tank.

6. The improvement of claim 5 wherein the pipe connections are made with discrete tee pipe fittings.

7. The improvement of claim 6 wherein the pipes and vent assembly are in the form of a kit whereby said pipes and vent assembly parts may be cut by an installer to the exact length to fit the configuration of the tanks.

8. The improvement of claim 2 wherein the said pipes and vent assembly are in the form of a kit containing said pipe and vent assembly elements, whereby these parts may be cut by an installer to the exact length to fit the configuration of said tanks.

* * * * *